United States Patent
Mahabal et al.

(10) Patent No.: US 8,538,984 B1
(45) Date of Patent: Sep. 17, 2013

(54) SYNONYM IDENTIFICATION BASED ON CO-OCCURRING TERMS

(75) Inventors: Abhijit A. Mahabal, Jersey City, NJ (US); Takahiro Nakajima, Chiba (JP); Zachary A. Garrett, Tokyo (JP); Kenji Inoue, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/438,125

(22) Filed: Apr. 3, 2012

(51) Int. Cl.
*G06F 17/30* (2006.01)

(52) U.S. Cl.
USPC .......................................... 707/769

(58) Field of Classification Search
USPC .................. 707/2, 3, 769; 709/219
See application file for complete search history.

(56) References Cited

U.S. PATENT DOCUMENTS

| | | |
|---|---|---|
| 7,636,714 B1 | 12/2009 | Lamping et al. |
| 2004/0186831 A1* | 9/2004 | Hiratsuka et al. ................. 707/3 |
| 2012/0166473 A1* | 6/2012 | Ahmadi et al. ............... 707/769 |

* cited by examiner

*Primary Examiner* — Etienne LeRoux
(74) *Attorney, Agent, or Firm* — Fish & Richardson P.C.

(57) ABSTRACT

Methods, systems, and apparatus, including computer programs encoded on a computer storage medium, for identifying a particular query term of an original search query, identifying a candidate synonym for the particular query term in context with an other non-adjacent query term of the original search query that is not adjacent to the particular query term in the original search query, accessing stored data that specifies, for a pair of terms that includes the particular query term and the candidate synonym of the particular query term, a respective confidence value for the other non-adjacent query term, determining that, in the stored data, the confidence value for the other non-adjacent query term satisfies a threshold, and determining to revise the original search query to include the candidate synonym of the particular query term, based on determining that the confidence value the other non-adjacent query term satisfies the threshold.

26 Claims, 6 Drawing Sheets

SYNONYM IDENTIFICATION BASED ON CO-OCCURRING TERMS

BACKGROUND

This specification generally relates to search engines, and one particular implementation relates to evaluating synonyms that are used in revising search queries.

SUMMARY

In general, one innovative aspect of the subject matter described in this specification can be embodied in methods that include the actions of evaluating a candidate synonym for a particular query term included in a search query using non-adjacent contexts. Specifically, a candidate synonym can be evaluated in order to determine if the candidate synonym is a synonym, or substitute term, for the particular query term, based on additional terms included in the search query that are not adjacent to the particular query term. For example, when the search query includes numerous terms, the context for a particular query term included at the beginning of the search query may be defined by a query term located at the end of the search query. The use of context for the particular query term can improve the overall confidence that a candidate synonym is a synonym for the particular query term.

For example, the user may enter the search query "What is the best place to find and eat Chicago deep dish style pizza?" In determining whether the term "restaurant" is a synonym for the query term "place", a synonym engine may evaluate the query term in the context of adjacent terms, such as "best" or "to," as well as non-adjacent terms, such as "Chicago" and "pizza." Such an evaluation may result in the decision that, in the context of the non-adjacent term "pizza," the term "restaurant" is a synonym of the query term "place."

In general, another innovative aspect of the subject matter described in this specification can be embodied in methods that include the actions of identifying a particular query term of an original search query, identifying a candidate synonym for the particular query term in context with an other non-adjacent query term of the original search query that is not adjacent to the particular query term in the original search query, accessing stored data that specifies, for a pair of terms that includes the particular query term and the candidate synonym of the particular query term, a respective confidence value for the other non-adjacent query term, determining that, in the stored data, the confidence value for the other non-adjacent query term satisfies a threshold, and determining to revise the original search query to include the candidate synonym of the particular query term, based on determining that the confidence value the other non-adjacent query term satisfies the threshold.

Other embodiments of this aspect include corresponding systems, apparatus, and computer programs, configured to perform the actions of the methods, encoded on computer storage devices.

These and other embodiments can each optionally include one or more of the following features.

The actions further include identifying one or more skip words in the original query, and selecting a query term of the original query terms that is not adjacent to the particular query term in the original query terms and that is not adjacent to a skip word.

The actions further include identifying a candidate synonym for the particular query term in context with an other query term of the original search query that is adjacent to the particular query term in the original search query, and determining that, in the stored data, a confidence value for the other adjacent query term does not satisfy a threshold. The actions further include determining, in the context of an adjacent query term to the particular query term, that the candidate synonym is a definitive non-synonym for the particular query term, and determining not to revise the original search query, based on determining that the candidate synonym is a definitive non-synonym for the particular query term. The other adjacent query term consists of two or more query terms that include a compound phrase.

The actions further include determining, in the context of a non-adjacent query term to the particular query term, that the candidate synonym is a definitive non-synonym for the particular query term, and determining not to revise the original search query, based on determining that the candidate synonym is a definitive non-synonym for the particular query term.

The actions further include determining two or more query terms comprise a compound phrase, and selecting a particular query term of the original search query that is not included in the compound phrase.

The other non-adjacent query term consists of two or more query terms that include a compound phrase.

Particular embodiments of the subject matter described in this specification can be implemented so as to realize one or more of the following advantages. The use of non-adjacent terms to a particular term in a search query to determine that a substitute term (synonym) for the particular query term is a good synonym for the particular query term can result in the identification and selection of more and better substitute terms for the particular query term when compared to the use of adjacent terms to the particular term for the determination. A confidence score is assigned to a candidate term/synonym pair in the context of the non-adjacent term that is indicative of the confidence in substituting the substitute term for the particular query term in the search query. In addition, the determination of a good substitute term for a particular query term can be based on a comparison of the confidence score for the candidate term/synonym pair to a threshold. Confidence scores that satisfy the threshold can indicate the substitute term is a good substitute term for the particular term when evaluated in the context of the non-adjacent query term.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
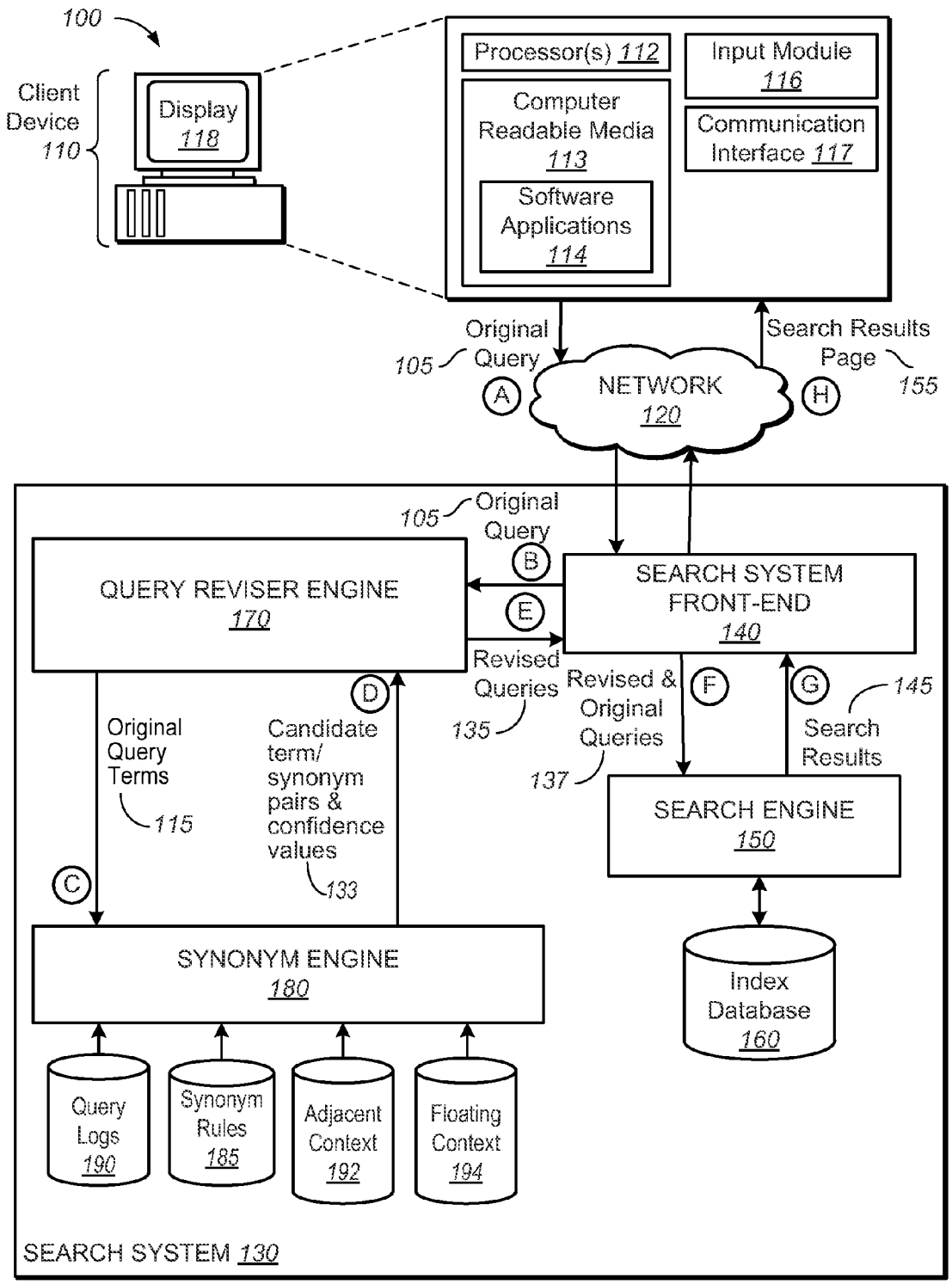
FIG. 1 is a block diagram illustrating an example system that revises search queries using synonyms of query terms, to improve the quality of search results.

FIG. 1 is a diagram of an example system 100 that can revise search queries using synonyms of query terms, to improve the quality of search results. In general, the system 100 includes a client device 110 coupled to a search system 130 over a network 120. The search system 130 includes a search engine 150, a query reviser engine 170, and a synonym engine 180.

The search system 130 receives a query 105, referred to by this specification as the "original query", the "original search query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original query 105. The search system 130 can generate or obtain other queries in numerous ways, e.g., by revising the original query 105.

In some implementations, the search system 130 can generate a revised query by adding to the original query 105 additional terms that are synonyms (or "substitute terms") of one or more terms that occur in the original query 105. In other implementations, the search system 130 can generate one or more revised queries 135 by substituting terms that are synonyms of terms that occur in the original query 105, in place of the terms in the original query 105, or by adding synonyms as a disjunction for the query terms.

The synonym engine 180 can identify the candidate synonyms (or "candidate substitute terms"), for the query terms, and the query reviser engine 170 can generate the revised queries using these candidate synonyms. The search engine 150 can use the original query 105 and the revised queries 135 to identify and rank search results. The search engine 150 can provide the identified search results 145 to the client device 110 on the search results page 155.

The synonym engine 180 can identify the synonyms the query reviser engine 170 can use to generate revised queries 135 by evaluating terms included in previously received queries stored in a query logs database 190. The queries stored in the query logs database 190 can include previous queries that led to search results that users indicated were of high quality, or that were determined by the search system 130 to satisfy users' information needs.

In identifying synonyms for a particular query term (e.g., "cat"), the synonym engine 180 or the query reviser engine 170 can evaluate candidate synonyms (e.g., "feline" or "banana") of the query term using various criteria. The synonym engine 180 or the query reviser engine 170 can determine that certain candidate synonyms are synonyms of the particular query term (as in the case of "feline") and that other candidate synonyms are not synonyms of the particular query term (as in the case of "banana").

In some implementations, the determination that a candidate synonym is a synonym can occur using synonym rules (or "term substitution rules") that are stored in a synonym rules database 185. In the above examples, a synonym rule can indicate that the candidate synonym "feline" is a synonym for the query term "cat," and that the candidate synonym "banana" is not a synonym for the query term "cat." As used by this specification, the synonym rule notation "cat→feline" indicates that, according to a particular synonym rule, the term "feline" is considered to be a synonym for the term "cat." Synonym rules are typically unidirectional.

The search system 130 can define synonym rules to apply generally, or to apply only when particular conditions, or "query contexts," are satisfied. For example, synonym rules can specify that a candidate synonym is a synonym of a query term in the general context, i.e., without requiring any other terms to occur in the search query, or in a specific context, i.e., only when one or more other terms are present in the search query.

A query term and a candidate synonym of the query term can be evaluated as a "candidate term/synonym pair". The synonym engine 180 has access to an adjacent context database 192 that specifies, for a candidate term/synonym pair under evaluation, a confidence value for the pair when the query term occurs in the context of another term that is adjacent to the query term in a search query. The synonym engine 180 can determine that the candidate synonym is a synonym for the query term when the confidence value for the candidate term/synonym pair satisfies a threshold.

The synonym engine 180 also has access to a floating context database 194 that specifies, for a candidate term/synonym pair under evaluation, a confidence value for the pair when the query term occurs in the context of another term that is not adjacent to the query term in a search query. The synonym engine 180 can determine that the candidate synonym is a synonym for the query term when the confidence value for the candidate term/synonym pair satisfies a threshold. The synonym engine 180 may use different thresholds when evaluating a candidate term/synonym pair using confidence values from the adjacent context database 192 and when using the confidence values from the floating context database 194.

In some implementations, the synonym rules database 185, the adjacent context database 192, and the floating context database 194 can be included in a single synonym database for use by the synonym engine 180. In this case, the synonym rules data, the adjacent context data and the floating context data can be labeled with markers associated with the data in order to distinguish each data type in the synonym database.

In some implementations, a context (adjacent or floating) can be based on multiple query terms (e.g., two or more query terms). In some cases, a candidate term/synonym pair can be evaluated based on multiple query terms which may be proximate to one another and where one of the query terms is adjacent to the candidate term. In other cases, a candidate term/synonym pair can be evaluated based on multiple query terms where the multiple query terms may be proximate to one another but not adjacent to the candidate term. In these cases, the use of multiple query terms when evaluating the candidate term/synonym pair can result in an increase in the decision strength (e.g., the confidence value for the candidate term/synonym pair) of whether the candidate synonym is a synonym for the query term.

In the illustrative example of FIG. 1, the search system 130 can be implemented as computer programs running on one or more computers in one or more locations that are coupled to each other through a network (e.g., network 120). The search system 130 includes a search system front-end 140 (e.g., a "gateway server") that coordinates requests between other parts of the search system 130 and the client device 110. The search system 130 also includes one or more "engines": the search engine 150, a query reviser engine 170, and the synonym engine 180.

As used in this specification, an "engine" (or "software engine") refers to a software implemented input/output system that provides an output that is different from the input. An engine can be an encoded block of functionality, such as a library, a platform, Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the synonym engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 can include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) can be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted original query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries 135 that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using synonyms for terms in the original query 105. In other implementations, the query reviser engine 170 generates a revised query by substituting the synonyms for the corresponding terms of the original query 105, or by adding the synonyms as a disjunction for the corresponding terms of the original query 105. The query reviser engine 170 can obtain synonyms for use in revising the original query 105 from the synonym engine 180.

During state (C), the query reviser engine 170 communicates original query terms 115 of the original query 105 to the synonym engine 180. The synonym engine 180 can use synonym rules included in the synonym rules database 185 and previously received queries stored in the query logs database 190 to identify one or more candidate synonyms for one or more of the original query terms 115 of the original query 105.

During state (D), the synonym engine 180 assigns confidence values for the candidate term/synonym pairs, i.e., the pair of terms that includes a term from the original query 105 and a corresponding candidate synonym of the term, using data from the adjacent context database 192 and the floating context database 194. Data identifying candidate term/synonym pairs and their assigned confidence values 133 is communicated from the synonym engine 180 to the query reviser engine 170.

Based on comparing the confidence values to thresholds, the query reviser engine 170 can select one or more of the candidate synonyms as synonyms of the query terms, and can generate one or more revised queries 135 using the selected candidate synonyms. The query reviser engine 170 communicates the one or more revised queries 135 to the search system front-end 140 during state (E).

The search system front-end 140 communicates queries 137, i.e., the original query 105 and one or more revised queries 135, to the search engine 150, during state (F). The search engine 150 generates search results 145 that are responsive to the original query 105 and/or the one or more revised queries 135. The search engine 150 can identify search results 145 for each query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include titles, text snippets, images, links, reviews, or other information. The original query terms 115 or the synonyms that appear in the text associated with the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H).

The client device 110 processes the document (e.g., using a layout engine) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

Figure 2:
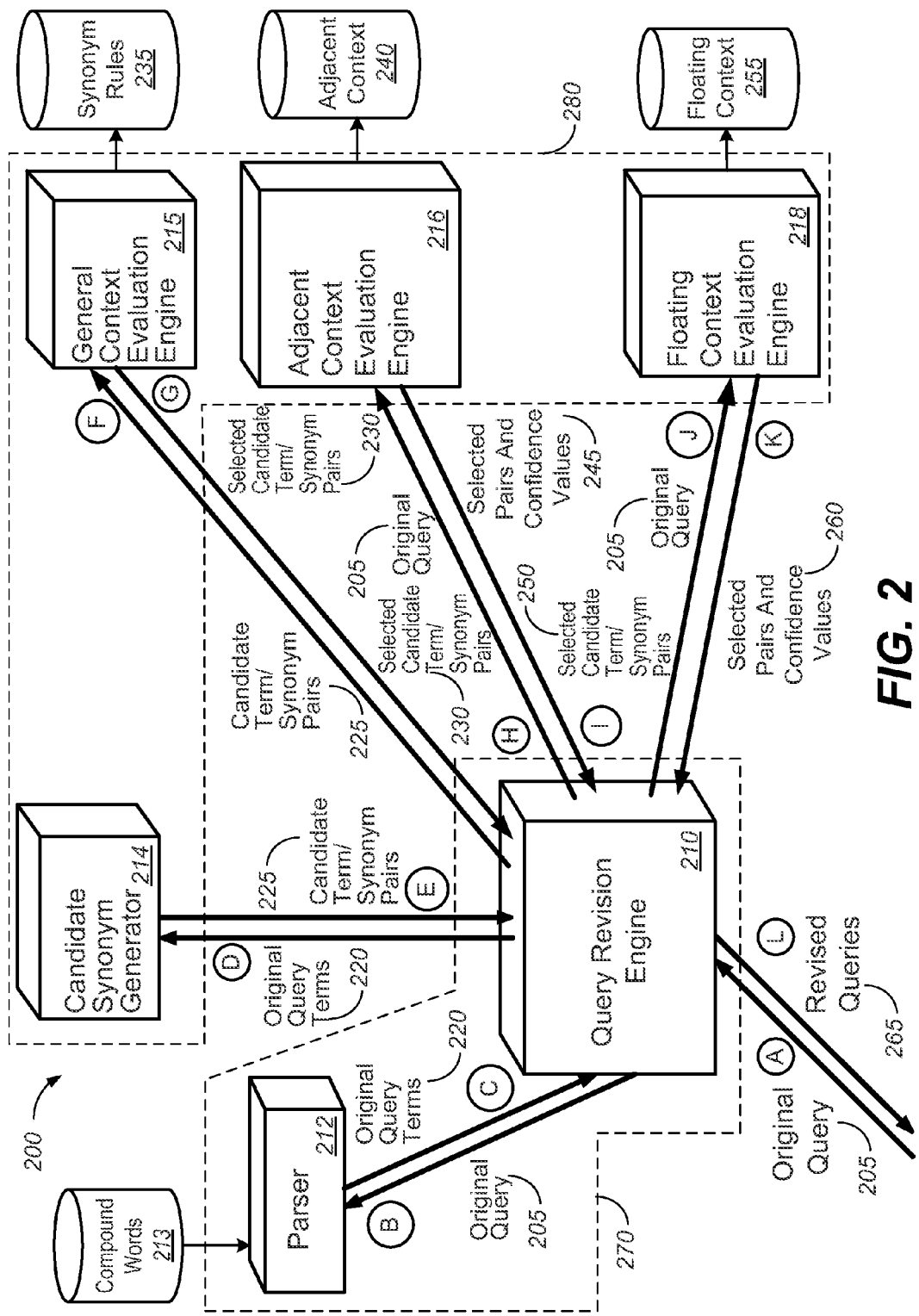
FIG. 2 is a diagram of an example system that identifies a synonym for a particular query term in a search query based on the context of the particular query term within the search query.

FIG. 2 is a diagram of an example system 200 that identifies a synonym for a particular query term in a search query based on the context of the particular query term within the search query. The system 200 includes a query reviser engine 270 that includes a query revision engine 210 and a parser 212. In addition, the system includes a synonym engine 280 that includes a candidate synonym generator 214, a general context evaluation engine 215, an adjacent context evaluation engine 216, and a floating context evaluation engine 218. The query revision engine 210 receives an original query 205 in state (A).

The query revision engine 210 communicates the original query 205 to the parser 212 in state (B), and the parser 212 identifies and outputs original query terms 220 of the original query 205. The original query 205 can potentially include one or more skip words, which the parser 212 can identify before sending the original query terms 220 back to the query revision engine 210. For example, for the original query, "dry food for my cat", the parser 212 can identify the terms "my" "for" and "dry," as skip words and can identify the original query terms 220 "cat" and "food" for use by the query revision engine 210.

In some cases, the parser 212 can identify compound words or phrases included in the original query 205, using data included in a compound words database 213. For example, when parsing the original query, "I want to read a book by Shakespeare Romeo and Juliet", the parser 212 can identify the term "Romeo and Juliet" as an n-gram, and can output the n-gram "Romeo and Juliet" to the query revision engine 210, instead of or in addition to outputting the constituent terms "Romeo," "and" and "Juliet."

During step (C), the parser 212 communicates the original query terms 220, with the skip words identified, to the query revision engine 210. The query revision engine 210 communicates the original query terms 220 to the candidate synonym generator 214, during state (D). The candidate synonym generator 214 generates the candidate synonyms for the original query terms 220 not identified as skip words, thereby defining candidate term/synonym pairs 225 for the original query terms 220.

The candidate synonym generator 214 communicates the candidate term/synonym pairs 225 to the query revision engine 210, during state (E). The query revision engine 210 communicates the candidate term/synonym pairs 225 to the general context evaluation engine 215 during state (F). The general context evaluation engine 215, using general context synonym rules included in a synonym rules database 235, evaluates the candidate term/synonym pairs 225, and selects any candidate term/synonym pairs 225 in which a general context rule identifies the candidate synonym as a synonym for the query term.

Once the general context evaluation engine 215 evaluates the received candidate term/synonym pairs 225, the general context evaluation engine 215 communicates any selected candidate term/synonym pairs 230 to the query revision engine 210 in state (G).

In some implementations, the general context evaluation engine 215 may communicate all of the received candidate term/synonym pairs 225 to the query revision engine 210 where each of the received candidate term/synonym pairs 225 includes a confidence value. For example, based on data included in the synonym rules database 235, the general context evaluation engine 215 may assign a high confidence value to a candidate term/synonym pair in which a general context synonym rule identifies the candidate synonym as a synonym for a query term. Conversely, the general context evaluation engine 215 may assign a low confidence value to a candidate term/synonym pair in which the candidate synonym is not identified as a synonym for a query term.

In some examples, the general context evaluation engine 215 can assign a high confidence value to a candidate term/synonym pair if the query term and the candidate synonym occur frequently together or in related user queries and query results. Alternatively, the general context evaluation engine 215 can assign a low confidence value to the candidate term/synonym pair if the query term and the candidate synonym do not often occur together in related user queries and query results. Once a confidence value is assigned, the query revision engine 210 can select a particular candidate term/synonym pair from among the candidate term/synonym pairs received from the general context evaluation engine 215 based on the respective confidence values.

The query revision engine 210 communicates the selected candidate term/synonym pairs 230 and the original query 205 to the adjacent context evaluation engine 216 during state (H). For each query term in the selected candidate term/synonym pairs 230, the adjacent context evaluation engine 216 identifies terms that are adjacent to the query term. The adjacent terms may occur before or after the query term in the search query. The adjacent terms may occur consecutively with the query term. In some implementations, where a skip word has been identified in the original query 205, the adjacent terms may occur non-consecutively with the query term, effectively "skipping over" the identified skip word.

In some implementations, the adjacent context evaluation engine 216 can identify and label skip words in the original query 205, maintaining the order of the terms in the query. For example, the original query 205 can be "I want to read a book by Shakespeare Romeo and Juliet". The adjacent context evaluation engine 216 can identify the words "I", "want", "to", "a", and "by" and label them as skip words and evaluate the query terms in the query in the order of "read book Shakespeare Romeo and Juliet".

In some cases, the query terms "Romeo and Juliet" can be considered a compound word and as such will be treated as a single term, and the constituent terms of the compound may not be evaluated separately in candidate term/synonym pairs.

In other cases, the adjacent context evaluation engine 216 may not consider the query terms "Romeo and Juliet" a compound word. The adjacent context evaluation engine 216 can then identify the skip words and evaluate the query terms in the query in the order of "read book Shakespeare Romeo Juliet". In some implementations, the query revision engine 210 can provide the original query terms 220 to the adjacent context evaluation engine 216. In this case, the parser 212 can identify skip words in the query, can identify any compound words in the query, and can maintain the order of the terms in the query.

Based on confidence value data included in an adjacent context database 240, the adjacent context evaluation engine 216 assigns a confidence value to a candidate term/synonym pair based on the context of the particular query term with respect to a term adjacent to the particular query term. The adjacent context evaluation engine 216 can determine that a candidate synonym in a candidate term/synonym pair is a synonym for the particular query term if the confidence value for the term/synonym pair satisfies a particular threshold.

In one example, a selected candidate term/synonym pair can be "book→play" for the query that includes original query terms "read book Shakespeare Romeo and Juliet". An adjacent term to the query term "book" is "read". Based on the confidence value data included in the adjacent context database 240, the adjacent context evaluation engine 216 can assign a confidence value to the candidate term/synonym pair "book→play" when the term "read" is adjacent to the particular query term "book". In this example, the confidence value does not satisfy the particular threshold indicating the term "play" may not be a good synonym for the particular query term "book" when the term "read" is adjacent to the particular query term "book". Another adjacent term to the query term "book" is "Shakespeare". Based on confidence value data included in the adjacent context database 240, the adjacent context evaluation engine 216 can assign a confidence value to the candidate term/synonym pair "book→play" when the term "Shakespeare" is adjacent to the particular query term "book". In this example, the confidence value satisfies the particular threshold indicating the term "play" may be a good synonym for the particular query term "book" when the term "Shakespeare" is adjacent to the particular query term "book".

If the confidence value assigned to at least one of the adjacent terms for the candidate term/synonym pair satisfies the particular threshold, then the adjacent context evaluation engine 216 may determine that the candidate synonym is a synonym for the particular query term in the context of the original query 205. The adjacent context evaluation engine 216 can then select the candidate term/synonym pair. The adjacent context evaluation engine 216 can identify additional candidate term/synonym pairs whose confidence values satisfy the particular threshold and communicate all selected candidate term/synonym pairs and confidence values 245 to the query revision engine in state (I).

If the confidence values assigned to each of the adjacent terms for the candidate term/synonym pair do not satisfy the particular threshold, then the adjacent context evaluation engine 216 may determine that the candidate synonym is not a synonym for the particular query term in the context of the original query 205. The adjacent context evaluation engine 216 may not select the candidate term/synonym pair and may not communicate the candidate term/synonym pair to the query revision engine 210.

The adjacent context evaluation engine 216 may determine that a candidate synonym in a selected candidate term/synonym pair is not a synonym for the particular query term (a definitive non-synonym). For example, selected candidate term/synonym pairs for the particular query term "AA" can include "AA→American Airlines" and "AA→Alcoholics Anonymous". For the original query, "I want to know the nearest locations of an AA meeting", based on the data in the adjacent context database 240, the adjacent context evaluation engine 216 can determine that the candidate synonym "American Airlines" is a definitive non-synonym for the particular query term "AA" when "AA" is before the adjacent term "meeting" in the original query.

In some implementations, the adjacent context evaluation engine 216 may not select and output the candidate term/synonym pair "AA→American Airlines" as one of the selected candidate term/synonym pairs and confidence values 245 returned to the query revision engine 210. In some implementations, the adjacent context evaluation engine 216 may include the candidate term/synonym pair "AA→American Airlines" with the selected candidate term/synonym pairs and confidence values 245 returned to the query revision engine 210 assigning the candidate term/synonym pair "AA→American Airlines" a low confidence value. In addition, the adjacent context evaluation engine 216 may include the candidate term/synonym pair "AA→Alcoholics Anonymous" with the selected candidate term/synonym pairs and confidence values 245 returned to the query revision engine 210 assigning the candidate term/synonym pair "AA→Alcoholics Anonymous" a high confidence value. In other implementations, the adjacent context evaluation engine 216 may include a definitive non-synonym flag with each of the selected candidate term/synonym pairs and confidence values 245 returned to the query revision engine 210. For example, setting the definitive non-synonym flag for a candidate term/synonym pair can indicate the candidate synonym is not a synonym for the particular query term.

In some cases, the confidence value for a candidate term/synonym pair can be based on the relative location of the adjacent term to the particular query term, i.e., whether the adjacent term is before or after the particular query term. In the above example, the adjacent context evaluation engine 216 determined for the original query, "I want to know the nearest locations of an AA meeting", that "American Airlines" was a definitive non-synonym for "AA" when "AA" is before the adjacent term "meeting" ("meeting" is to the right of "AA"). However, for the original query, "I would like a meeting with the AA pilots", identifying the skip words results in the original query terms "meeting AA pilots" for use in as synonyms in candidate term/synonym pairs. In this example, the adjacent context evaluation engine 216 can assign a confidence value to each candidate term/synonym pair for the query term "AA" ("AA→"Alcoholic Anonymous" and "AA→American Airlines"). The adjacent context evaluation engine 216 can identify "Alcoholic Anonymous" and "American Airlines" as synonyms for "AA" when the particular query term "AA" is after the adjacent term "meeting" ("meeting" is to the left of "AA").

In some implementations, the adjacent context evaluation engine 216 can assign a confidence value to each evaluated candidate term/synonym pair. The confidence value can be the largest of the confidence values assigned to each adjacent query term evaluated in the context of the particular query term. In some cases, the confidence value may satisfy a particular threshold indicating the candidate synonym in the candidate term/synonym pair is a synonym for the particular query term. In other cases, the confidence value may not satisfy a particular threshold indicating the candidate synonym in the candidate term/synonym pair may not be a synonym for the particular query term.

In some implementations, the adjacent context evaluation engine 216 can select candidate term/synonym pairs whose confidence values satisfy the particular threshold and communicate the selected candidate term/synonym pairs and their assigned confidence values as the selected candidate term/synonym pairs and confidence values 245. In some implementations, the adjacent context evaluation engine 216 can communicate all of the evaluated candidate term/synonym pairs (e.g., selected candidate term/synonym pairs 230) and their assigned confidence values as the selected candidate term/synonym pairs and confidence values 245. The query revision engine 210 may then select candidate term/synonym pairs based on their assigned confidence values as compared to a particular threshold included in the query revision engine 210.

The query revision engine 210 can communicate the candidate term/synonym pairs selected from the selected candidate term/synonym pairs and confidence values 245 to the floating context evaluation engine 218 as selected candidate term/synonym pairs 250 in state (J). In some implementations, the query revision engine 210 may select all of the received selected candidate term/synonym pairs and confidence values 245. The query revision engine 210 can communicate all of the candidate term/synonym pairs received from the adjacent context evaluation engine 216 (e.g., the selected candidate term/synonym pairs and confidence values 245) to the floating context evaluation engine 218 as selected candidate term/synonym pairs 250 in state (J). In addition, the query revision engine 210 can communicate the original query 205 to the floating context evaluation engine 218 in state (J).

Based on data included in the floating context database 255, the floating context evaluation engine 218, can assign a confidence value to each of the selected candidate term/synonym pairs 250. The floating context evaluation engine 218 can evaluate the particular query term in the context of a query term that is not adjacent to the particular query. The process for assigning a confidence value to a candidate term/synonym pair based on the context of a query term that is not adjacent to the particular query term is similar to the process for assigning a confidence value to a candidate term/synonym pair based on the context of a query term that is adjacent to the particular query term.

The floating context evaluation engine 218 can include a particular threshold. The floating context evaluation engine 218 can determine that a candidate synonym in a candidate term/synonym pair is a synonym for the particular query term if the confidence value assigned to the non-adjacent term for the candidate term/synonym pair satisfies the particular threshold. The confidence value assigned to the non-adjacent term for the candidate term/synonym pair is based on the context of the non-adjacent term with the particular query term.

For example, a selected candidate term/synonym pair can be "book→play" for the original query 205 that includes original query terms "read book Shakespeare Romeo and Juliet". The adjacent context evaluation engine 216 can determine that the confidence value for the term/synonym pair "book→play" when the term "Shakespeare" is adjacent to and after the particular query term "book" does not satisfy the particular threshold included in the adjacent context evaluation engine 216. This indicates that the term "play" may not be a synonym for the particular query term "book" when the term "Shakespeare" is adjacent to and after the particular query term "book". In addition, the adjacent context evaluation engine 216 can determine that a confidence value for the term/synonym pair "book→play" when the term "read" is adjacent to and before the particular query term "book" also does not satisfy the particular threshold. This indicates the term "play" may not be a synonym for the particular query term "book" when the term "read" is adjacent to the particular query term "book".

However, based on the confidence value data included in a floating context database 255, the floating context evaluation engine 218 can assign a confidence value to the term/synonym pair "book→play" in the context of the n-gram "Romeo and Juliet". The floating context evaluation engine 218 can identify this context when the n-gram "Romeo and Juliet" is included in the original query and the n-gram is not adjacent to the particular query term. In addition, the n-gram "Romeo and Juliet" can be included in the original query at any position relative to the particular query term "book" (e.g., before or after). The floating context evaluation engine 218 can determine that the confidence value satisfies the particular threshold included in the floating context evaluation engine 218 indicating the term "play" is a synonym for the particular query term "book" when the n-gram "Romeo and Juliet" is included in the same query with the term "book". In this example, the adjacent context evaluation engine 216 may have determined that the term "play" is not a synonym for "book" in the original query 205. However, it is well known that Shakespeare was the author of many plays, "Romeo and Juliet" being one of them. Shakespeare also wrote many sonnets and narrative poems. Therefore, one can understand why the confidence value assigned to the term/synonym pair "book→play" in the context of Shakespeare may not satisfy a particular threshold while the confidence value assigned to the term/synonym pair "book→play" in the context of "Romeo and Juliet" (one of Shakespeare's plays) would satisfy the particular threshold.

In some implementations, the adjacent context evaluation engine 216 and the floating context evaluation engine 218 may each use a different threshold with which to evaluate the confidence values for a term/synonym pair. This allows each evaluation engine to determine how narrow the evaluation and selection process will be for determining synonyms for particular query terms. As in the case of the adjacent context evaluation engine 216, the floating context evaluation engine 218 can also determine that a candidate synonym in a selected candidate term/synonym pair is not a synonym for the particular query term (a definitive non-synonym). For example, the original query 205 is, "What is the number of pilots that are female at AA as of January 2011?" The selected candidate term/synonym pairs for the particular query term "AA" can include "AA→American Airlines" and "AA→Alcoholics Anonymous". The adjacent context evaluation engine 216, evaluating the candidate term/synonym pairs "AA→American Airlines" and "AA→Alcoholics Anonymous" for the particular query term "AA" in the context of the adjacent query terms (e.g., "female" and "January") may determine that both candidate term/synonym pairs include candidate synonyms for the particular query term "AA".

However, based on data included in the floating context database 255, the floating context evaluation engine 218 can determine the candidate synonym "Alcoholics Anonymous" is a definitive non-synonym for the particular query term "AA" when the particular query term "AA" is used in context with the query term "pilots" in the original query 205. In this example, the selected candidate term/synonym pairs 250 communicated to the floating context evaluation engine 218 can include the candidate term/synonym pairs "AA→American Airlines" and "AA→Alcoholics Anonymous". Selected candidate term/synonym pairs and confidence values 260 communicated from the floating context evaluation engine 218 to the query revision engine 210 may not include the candidate term/synonym pair "AA→Alcoholics Anonymous". Therefore, "Alcoholics Anonymous" can be considered a definitive non-synonym for the particular query term "AA" when the term "pilots" is included anywhere in the original query 205.

If the confidence value assigned to at least one of the non-adjacent terms for the candidate term/synonym pair satisfies the particular threshold, the floating context evaluation engine 218 can determine that the candidate synonym is a synonym for the particular query term in the context of the original query 205. The floating context evaluation engine 218 can then select the candidate term/synonym pair. The floating context evaluation engine 218 can select additional candidate term/synonym pairs whose confidence values satisfy the particular threshold and communicate all of the selected candidate term/synonym pairs and confidence values 260 to the query revision engine 210 in state (K).

If the confidence values assigned to all of the non-adjacent terms for the candidate term/synonym pair do not satisfy the particular threshold, then the floating context evaluation engine 218 can determine that the candidate synonym may not be a synonym for the particular query term in the context of the original query 205. The floating context evaluation engine 218 may not select the candidate term/synonym pair and may not communicate the candidate term/synonym pair as one of the selected candidate term/synonym pairs and confidence values 260 to the query revision engine 210.

In some implementations, the floating context evaluation engine 218 can assign each evaluated candidate term/synonym pair a confidence value that is the largest of the confidence values assigned to each non-adjacent query term evaluated in the context of the particular query term. In some cases, the confidence value may satisfy a particular threshold indicating the candidate synonym in the candidate term/synonym pair is a good synonym for the particular query term. In other cases, the confidence value may not satisfy a particular threshold indicating the candidate synonym in the candidate term/synonym pair may not be a synonym for the particular query term. In some implementations, the floating context evaluation engine 218 can select term/synonym pairs whose confidence values satisfy the particular threshold and communicate the selected candidate term/synonym pairs and their assigned confidence values as the selected candidate term/synonym pairs and confidence values 260. In some implementations, the floating context evaluation engine 218 can communicate all of the evaluated candidate term/synonym pairs and their assigned confidence values as the selected candidate term/synonym pairs and confidence values 260. The query revision engine 210 may then select candidate term/synonym pairs based on their confidence values as compared to a particular threshold included in the query revision engine 210.

The query revision engine 210 can generate one or more revised queries 265 in state (L). In some implementations, the query revision engine 210 may use all the selected candidate term/synonym pairs received from the floating context evaluation engine 218 when generating the revised queries 265. The query revision engine 210 can use each candidate synonym for a particular query term in a candidate term/synonym pair as a synonym for the particular query term in one or more revised queries that may or may not also include the particular query term. In some implementations, in addition, the query revision engine 210 may use the selected candidate term/synonym pairs received from the adjacent context evaluation engine 216 when generating the revised queries 265. The query revision engine 210 may use a candidate synonym for a particular query term from a candidate term/synonym pair included in the selected candidate term/synonym pairs and confidence values 245 received from the adjacent context evaluation engine 216, but not included in the selected candidate term/synonym pairs and confidence values 260 received from the floating context evaluation engine 218, in one or more revised queries.

In some implementations, the query revision engine 210 may include a particular threshold. The query revision engine 210 may additionally select candidate term/synonym pairs from the selected candidate term/synonym pairs and confidence values 260 based on the particular threshold. For example, the query revision engine 210 may select a candidate term/synonym pair from the selected candidate term/synonym pairs and confidence values 260 if the confidence value for the candidate term/synonym pair satisfies the particular threshold. In this case, the query revision engine 210 can further reduce the number of candidate synonyms for a particular query term. For example, the query revision engine 210 may be included in a system with limited search bandwidth that may limit the number of queries performed. The further reduction in the number of candidate synonyms can result in fewer synonyms for a particular query term thereby reducing the number of revised queries generated by the query revision engine 210.

Figure 3:
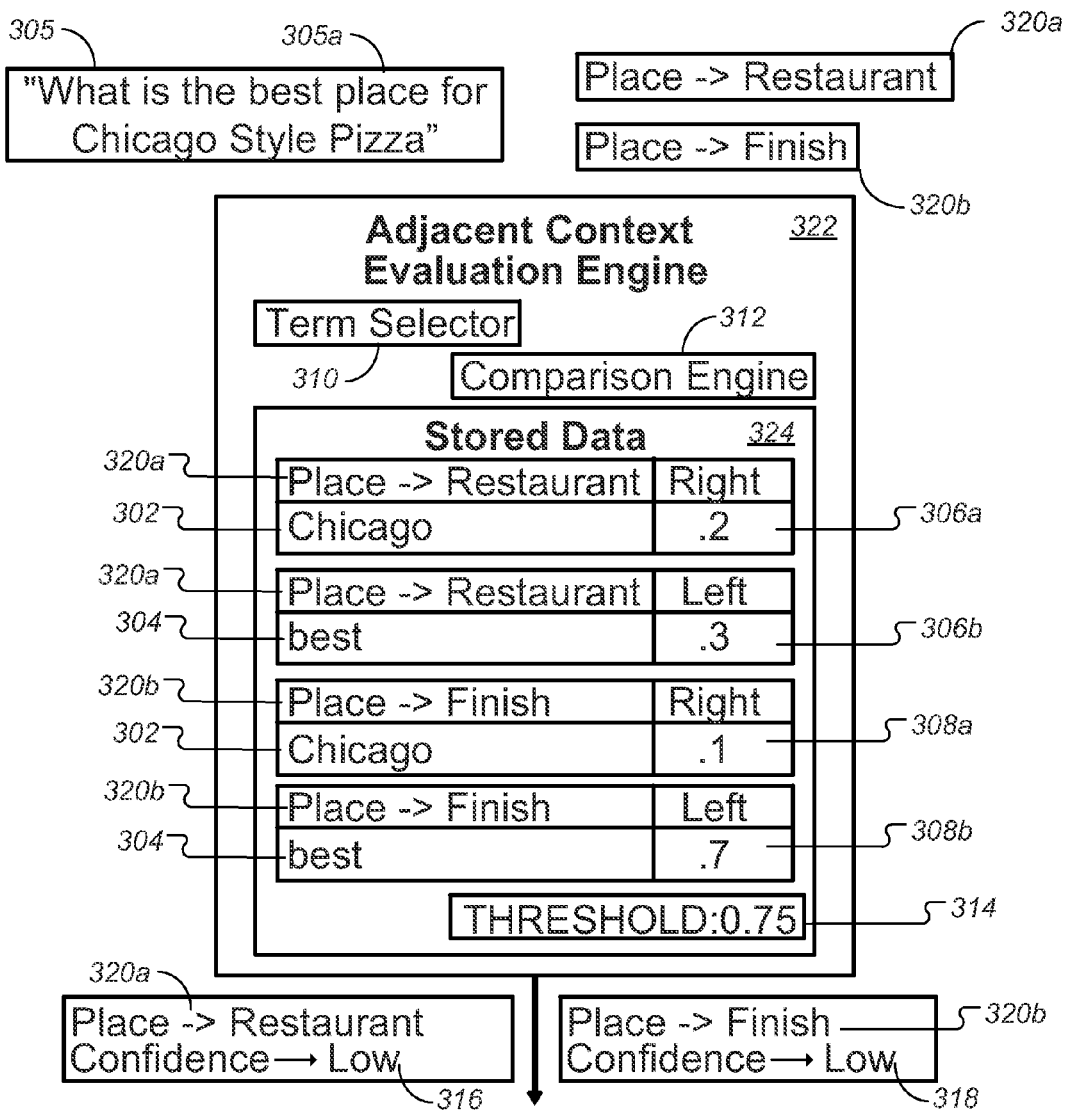
FIG. 3 is a block diagram illustrating example candidate term/synonym pairs for a particular query term for evaluation by an adjacent context evaluation engine.
Figure 4:
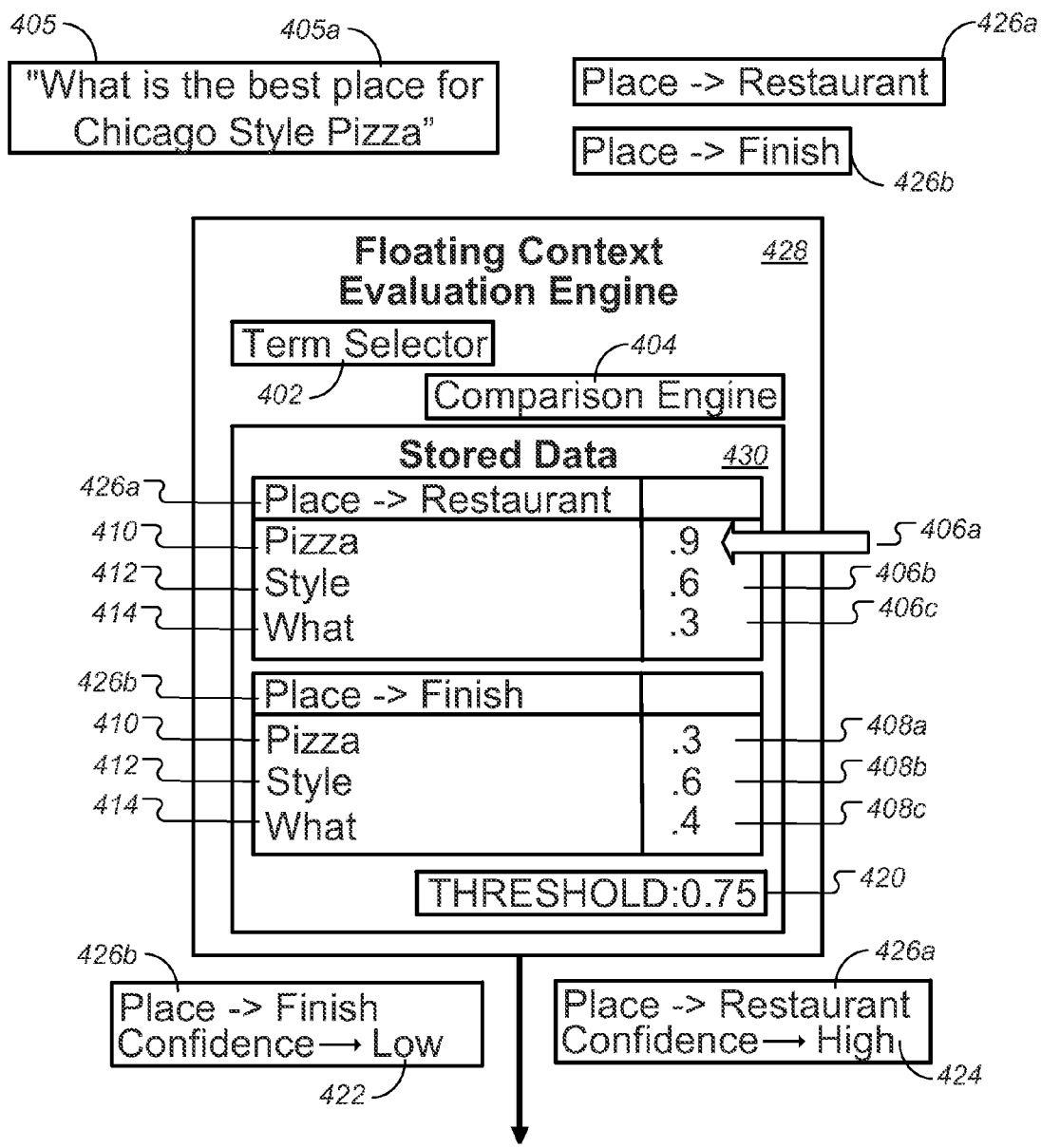
FIG. 4 is a block diagram illustrating example candidate term/synonym pairs for a particular query term for evaluation by a floating context evaluation engine.

In general, the floating context evaluation engine 218 can assign confidence values for a candidate term/synonym pair using more of the query terms in the context of the particular query term than the adjacent context evaluation engine 216. This is because the floating context evaluation engine 218 can use query terms not adjacent to the particular query term in its evaluations. This can occur when an original query includes more than three original query terms (more than the particular query term and its two adjacent terms). FIG. 3 and FIG. 4 show an example original query where the confidence values for adjacent query terms and non-adjacent query terms, respectively, in the context of a particular query term are used when assigning a confidence value to a candidate term/synonym pair.

FIG. 3 is a block diagram illustrating example candidate term/synonym pairs 320a, 320b for a particular query term 305a ("place") for evaluation by an adjacent context evaluation engine 322. In addition, FIG. 3 shows confidence values 306a-b, 308a-b, for the candidate term/synonym pairs 320a and 320b, respectively.

A term selector 310, included in the adjacent context evaluation engine 322, can select query terms adjacent to the particular query term (e.g., particular query term 305a) from the original query 305. In some implementations, the term selector 310 can identify the query term "for" as a skip word. In some implementations, the adjacent context evaluation engine 322 can receive original query terms with the skip words identified. The term selector 310 can identify an adjacent query term 302 ("Chicago") to the right of the particular query term 305a ("place") and an adjacent query term 304 ("best") to the left of the particular query term 305a ("place").

Based on data included in an adjacent context database 324, the adjacent context evaluation engine 322 can assign confidence values to each of the selected candidate term/synonym pairs (e.g., candidate term/synonym pairs 320a, 320b). The adjacent context evaluation engine 322 can assign the confidence value to a candidate term/synonym pair based on a confidence value for the candidate synonym as a synonym for the particular query term when evaluating the particular query term in the context of each adjacent query term.

In the example shown in FIG. 3, the confidence value 306a is based on the evaluation of the candidate synonym "restaurant" as a synonym for the particular query term 305*a* ("place") when the particular query term 305*a* ("place") is adjacent to the query term 302 ("Chicago"). The confidence value 306*b* is based on the evaluation of the candidate synonym "restaurant" as a synonym for the particular query term 305*a* ("place") when the particular query term 305*a* ("place") is adjacent to the query term 304 ("best"). The confidence value 308*a* is based on the evaluation of the candidate synonym "finish" as a synonym for the particular query term 305*a* ("place") when the particular query term 305*a* ("place") is adjacent to the query term 302 ("Chicago"). The confidence value 306*b* is based on the evaluation of the candidate synonym "finish" as a synonym for the particular query term 305*a* ("place") when the particular query term 305*a* ("place") is adjacent to the query term 304 ("best").

A comparison engine 312, included in the adjacent context evaluation engine 322, can compare each of the confidence values 306*a-b*, 308*a-b* to a particular threshold 314 in order to assign a confidence value 316, 318 to each candidate term/synonym pair 320*a-b*, respectively. For example, the confidence value 306*a* for the adjacent query term 302 ("Chicago") when evaluated in the context of the candidate term/synonym pair 320*a* ("restaurant" as a candidate synonym for "place") does not satisfy the particular threshold 314. In addition, the confidence value 306*b* for the adjacent query term 304 ("best") when evaluated in the context of the candidate term/synonym pair 320*a* ("restaurant" as a candidate synonym for "place") also does not satisfy the particular threshold 314. Therefore, the adjacent context evaluation engine 322 assigns a low confidence value 316 to the candidate term/synonym pair 320*a*. As such, the candidate synonym "restaurant" may not be a synonym for the query term "place" when "place" is evaluated in the context of the adjacent query term 302 ("Chicago") and the adjacent query term 304 ("best").

The confidence value 308*a* for the adjacent query term 302 ("Chicago") when evaluated in the context of the candidate term/synonym pair 320*b* ("finish" as a candidate synonym for "place") does not satisfy the particular threshold 314. The confidence value 308*b* for the adjacent query term 304 ("best") when evaluated in the context of the term/synonym pair 320*b* ("finish" as a candidate synonym for "place") also does not satisfy the particular threshold 314. Therefore, the adjacent context evaluation engine 322 assigns a low confidence value 318 to the candidate term/synonym pair 320*b*. As such, the candidate synonym "finish" may not be a synonym for the query term "place" when "place" is evaluated in the context of the adjacent query term 302 ("Chicago") and the adjacent query term 304 ("best").

In some implementations, the adjacent context evaluation engine 322 can assign a numerical confidence value to each candidate term/synonym pair. For example, the assigned confidence value can be an average of the confidence values assigned to each adjacent query term when not all of the confidence values satisfy the particular threshold or when all of the confidence values satisfy the particular threshold. In the example shown in FIG. 3, the adjacent context evaluation engine 322 can assign the numerical confidence value "0.25" to the candidate term/synonym pair 320*a*, where "0.25" is the average of confidence value 306*a* and confidence value 306*b*. The adjacent context evaluation engine 322 can assign the numerical confidence value "0.40" to the candidate term/synonym pair 320*b*, where "0.40" is the average of confidence value 308*a* and confidence value 308*b*.

In another example, the confidence value assigned to a candidate term/synonym pair can be the larger of the confidence values assigned to each adjacent query term. In the example shown in FIG. 3, the adjacent context evaluation engine 322 can assign the numerical confidence value "0.30" to the candidate term/synonym pair 320*a*, where "0.30" is the larger of the confidence values 306*a-b*. The adjacent context evaluation engine 322 can assign the numerical confidence value "0.70" to the candidate term/synonym pair 320*b*, where "0.70" is the larger of the confidence values 308*a-b*. In another example, the confidence value assigned to a candidate term/synonym pair can be the smaller of the confidence values assigned to each adjacent query term when none of the confidence values satisfy the particular threshold. In the example shown in FIG. 3, the adjacent context evaluation engine 322 can assign the numerical confidence value "0.20" to the candidate term/synonym pair 320*a*, where "0.20" is the smaller of the confidence values 306*a-b*. The adjacent context evaluation engine 322 can assign the numerical confidence value "0.10" to the candidate term/synonym pair 320*b*, where "0.10" is the smaller of the confidence values 308*a-b*.

FIG. 4 is a block diagram illustrating example candidate term/synonym pairs 426*a*, 426*b* for a particular query term 405*a* ("place") for evaluation by a floating context evaluation engine 428. In addition, FIG. 4 shows confidence values 406*a-c*, 408*a-c*, for the candidate term/synonym pairs 426*a* and 426*b*, respectively.

A term selector 402, included in the floating context evaluation engine 428, can select query terms included in the original query 405 that are not adjacent to the particular query term (e.g., particular query term 405*a*). In addition, the term selector 402 can identify one or more skip words included in the original query 405. In some implementations, the term selector 402 can identify the words "is", "the", and "for" as skip words. The term selector 402 can identify a non-adjacent query term 410 ("pizza"), a non-adjacent query term 412 ("style"), and a non-adjacent query term 414 ("what").

Based on data included in a floating context database 430, the floating context evaluation engine 428 can assign confidence values to each of the selected candidate term/synonym pairs (e.g., candidate term/synonym pairs 426*a*, 426*b*). The floating context evaluation engine 428 can assign the confidence value to a candidate term/synonym pair based on a confidence value for the candidate synonym as a synonym for the particular query term when evaluating the particular query term in the context of each non-adjacent query term.

In the example shown in FIG. 4, the confidence value 406*a* is based on the evaluation of the candidate synonym "restaurant" as a synonym for the particular query term 405*a* ("place") when the particular query term 405*a* ("place") is evaluated in the context of the non-adjacent query term 410 ("pizza"). The confidence value 406*b* is based on the evaluation of the candidate synonym "restaurant" as a synonym for the particular query term 405*a* ("place") when the particular query term 405*a* ("place") is evaluated in the context of the non-adjacent query term 412 ("style"). The confidence value 406*c* is based on the evaluation of the candidate synonym "restaurant" as a synonym for the particular query term 405*a* ("place") when the particular query term 405*a* ("place") is evaluated in the context of the non-adjacent query term 414 ("what").

The confidence value 408*a* is based on the evaluation of the candidate synonym "finish" as a synonym for the particular query term 405*a* ("place") when the particular query term 405*a* ("place") is evaluated in the context of the non-adjacent query term 410 ("pizza"). The confidence value 408*b* is based on the evaluation of the candidate synonym "finish" as a synonym for the particular query term 405*a* ("place") when the particular query term 405*a* ("place") is evaluated in the context of the non-adjacent query term 412 ("style"). The confidence value 408c is based on the evaluation of the candidate synonym "finish" as a synonym for the particular query term 405a ("place") when the particular query term 405a ("place") is evaluated in the context of the non-adjacent query term 414 ("what").

A comparison engine 404, included in the floating context evaluation engine 428, can compare each of the confidence values 406a-c, 408a-c to a particular threshold 420 in order to assign a confidence value 422, 424 to each candidate term/synonym pair 426a-b, respectively. For example, the confidence value 406a for the non-adjacent query term 410 ("pizza") when evaluated in the context of the candidate term/synonym pair 426a ("restaurant" as a candidate synonym for "place") satisfies the particular threshold 420. The confidence value 406b for the non-adjacent query term 412 ("style") when evaluated in the context of the candidate term/synonym pair 426a ("restaurant" as a candidate synonym for "place") does not satisfy the particular threshold 420. The confidence value 406c for the non-adjacent query term 412 ("what") when evaluated in the context of the candidate term/synonym pair 426a ("restaurant" as a candidate synonym for "place") also does not satisfy the particular threshold 420. Therefore, the floating context evaluation engine 428 assigns a high confidence value 424 to the candidate term/synonym pair 426a because, when evaluated in the context of the non-adjacent query term 410 ("pizza"), "restaurant" can be a synonym for the particular query term 405a ("place").

The confidence value 408a for the non-adjacent query term 410 ("pizza") when evaluated in the context of the candidate term/synonym pair 426b ("finish" as a synonym for "place") does not satisfy the particular threshold 420. The confidence value 408b for the non-adjacent query term 412 ("style") when evaluated in the context of the candidate term/synonym pair 426b ("finish" as a synonym for "place") also does not satisfy the particular threshold 420. In addition, the confidence value 408c for the non-adjacent query term 412 ("what") when evaluated in the context of the candidate term/synonym pair 426b ("finish" as a synonym for "place") does not satisfy the particular threshold 420. As such, the candidate synonym "finish" may not be a synonym for the query term "place" when "place" is evaluated in the context of the non-adjacent terms 410, 412, and 414.

In some implementations, the floating context evaluation engine 428 can assign a numerical confidence value to each candidate term/synonym pair. For example, the assigned confidence value can be an average of the confidence values assigned to each non-adjacent query term when not all of the confidence values satisfy the particular threshold or when all of the confidence values satisfy the particular threshold. In the example shown in FIG. 4, the floating context evaluation engine 428 can assign the numerical confidence value "0.43" to the candidate term/synonym pair 426b. In another example, the confidence value assigned to a candidate term/synonym pair can be the larger of the confidence values assigned to each non-adjacent query term. In the example shown in FIG. 4, the floating context evaluation engine 428 can assign the numerical confidence value "0.90" to the term/synonym pair 426. In addition, the floating context evaluation engine 428 can assign the numerical confidence value "0.60" to the candidate term/synonym pair 426b. In another example, the confidence value assigned to a candidate term/synonym pair can be the smaller of the confidence values assigned to each non-adjacent query term when not all of the confidence values satisfy the particular threshold. In the example shown in FIG. 4, the floating context evaluation engine 428 can assign the numerical confidence value "0.30" to the candidate term/synonym pair 426b.

Figure 5:
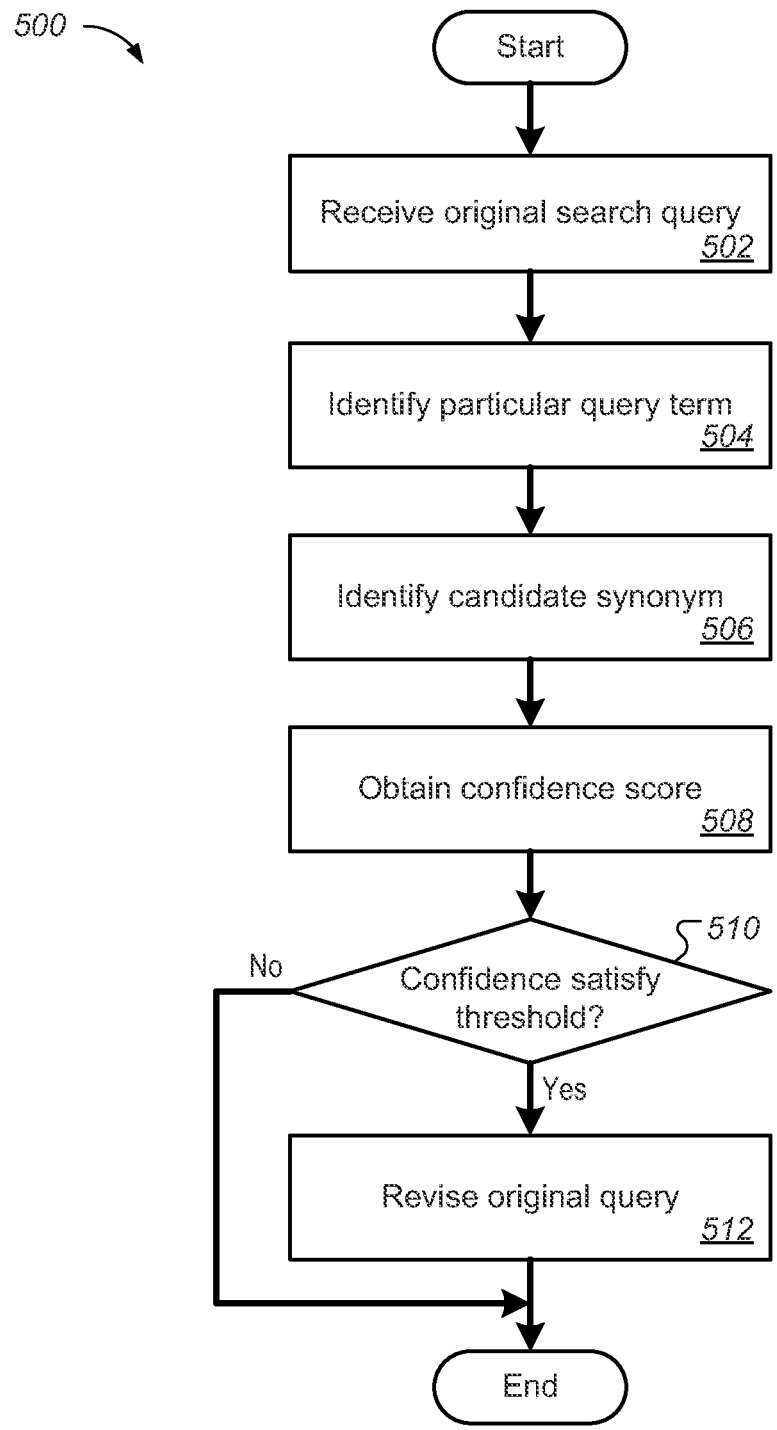
FIG. 5 is a flow diagram illustrating an example process for determining a synonym for a particular query term in a search query.

FIG. 5 is a flow diagram illustrating an example process 500 for determining a synonym for a particular query term in a search query. For example, the search system 130 shown in FIG. 1 can execute the process 500.

The process 500 begins by receiving an original search query (step 502). For example, the search system 130 receives the original query 105 by way of network 120 from the client device 110. A particular query term is identified (step 504). For example, the synonym engine 180 can identify a particular query term included in the original query terms 115 generated by the query reviser engine 170 and communicated to the synonym engine 180. Candidate synonyms are identified (step 506). For example, a candidate synonym can be identified for the particular query term in context with an other non-adjacent query term of the original query terms 115 that is not adjacent to the particular query term in the original query terms 115. A confidence score is obtained (step 508). Stored data can be accessed that specifies, for a pair of terms that includes the particular query term and the candidate synonym of the particular query term, a confidence value for the other query term. For example, the synonym engine 180 can access data included in the floating context database 194. The data can provide confidence values assigned to query terms not adjacent to the particular query term when evaluated in the context of the particular query term for a candidate term/synonym pair. The confidence value can indicate if the candidate synonym is a synonym for the particular query term based on the context of the particular query term with respect to the non-adjacent query term.

If the confidence value assigned to the selected non-adjacent query term satisfies a particular threshold (step 510), the candidate synonym in the candidate term/synonym pair can be considered a synonym for the particular query term and can be used to revise the original query (step 512). If the confidence value assigned to a non-adjacent query term does not satisfy a particular threshold (step 510), the candidate synonym is not considered a synonym for the particular query term and the process 500 ends.

Figure 6:
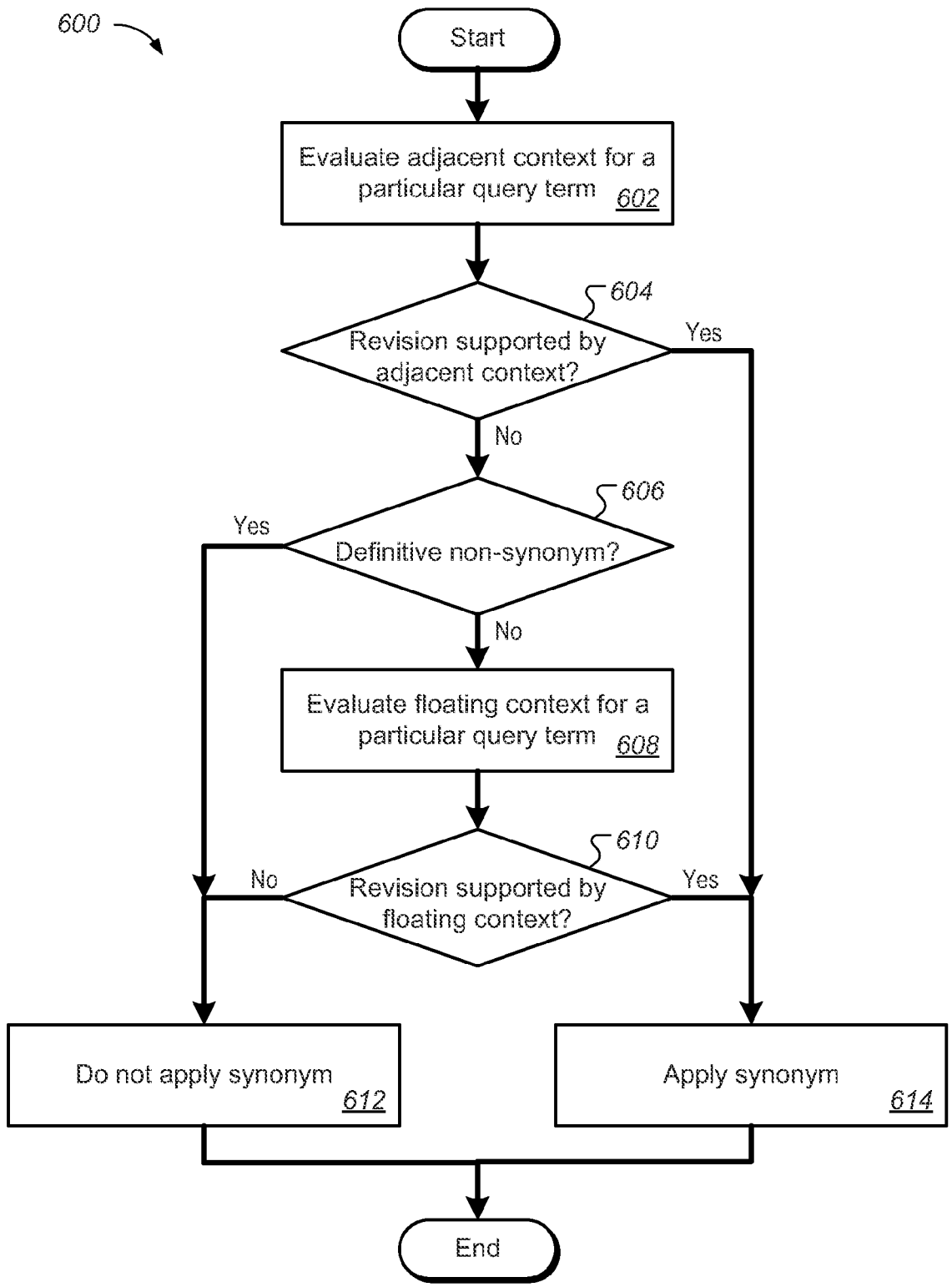
FIG. 6 is a flow diagram illustrating an example process for determining a definitive non-synonym for a particular query term in a search query.

FIG. 6 is a flow diagram illustrating an example process 600 for determining definitive non-synonyms for a particular query term in a search query. For example, the system 200 shown in FIG. 2 can execute the process 600.

The process 600 begins by evaluating the adjacent context for a particular query term (step 602). For example, referring to FIG. 2, the adjacent context evaluation engine 216 can identify adjacent query terms to a particular query term in an original search query. The adjacent context evaluation engine 216 can assign a confidence value to a candidate synonym for the particular query term when evaluating the particular query term in the context of the adjacent query term. The confidence value assigned to the adjacent query term can be a confidence value for the candidate term/synonym pair that includes the particular query term and the candidate synonym. For example, original query terms can include "AA meeting", where "AA" is the particular query term and "meeting" is the adjacent query term. Candidate synonyms for "AA" can include "Alcoholics Anonymous" and "American Airlines". The adjacent context evaluation engine 216 can assign a low confidence value to the adjacent query term "meeting" when the candidate synonym "American Airlines" is evaluated as a synonym for "AA" in the context of the query term "meeting". As such, the adjacent context evaluation engine 216 can assign a low confidence value to the candidate term/synonym pair "AA→American Airlines". In addition, the adjacent context evaluation engine 216 can assign a high confidence value to the adjacent query term "meeting" for the candidate term/synonym pair "AA→Alcoholics Anonymous" when "Alcoholics Anonymous" is evaluated as a synonym for "AA" in the context of the query term "meeting". As such, the adjacent context evaluation engine 216 can assign a high confidence value to the candidate term/synonym pair "AA→Alcoholics Anonymous".

It is determined the revision is not supported by the adjacent context (step 604). For example, the adjacent context evaluation engine 216, using data included in the adjacent context database 240, determines that the revision of the query "AA meeting" substituting "American Airlines" as a synonym for "AA" is not supported by the adjacent context. The adjacent context evaluation engine 216 makes this determination based on the low confidence value for the candidate term/synonym pair "AA→American Airlines".

A definitive non-synonym is determined (step 606). For example, the adjacent context evaluation engine 216 determines that the candidate synonym "American Airlines" is a definitive non-synonym for "AA" when "American Airlines" is evaluated as a synonym for "AA" in the adjacent context of "meeting". The adjacent context evaluation engine 216 makes this determination based on the strong association of the synonym "Alcoholics Anonymous" with the query term "AA" in the adjacent context of "meeting". The synonym is not applied (step 612). For example, the definitive non-synonym "American Airlines" is not used as a synonym for "AA" in a revised query.

If it is determined that the revision is supported by the adjacent context (step 604), the synonym is applied (step 614). For example, the candidate synonym "Alcoholics Anonymous" is supported by the adjacent context "meeting" and, as such, can be applied as a synonym for "AA" in the original query generating the revised query "Alcoholics Anonymous meeting".

For example, in the process 600, when the adjacent context evaluation engine 216 determines that a candidate synonym for a particular query term is a definitive non-synonym for the particular query term, the adjacent context evaluation engine 216 may not include the definitive non-synonym as a candidate synonym for the particular query term in a selected term/synonym pair communicated to the query revision engine 210.

In this case, the floating context evaluation engine 218 may not evaluate non-adjacent terms in the context of the particular query term when assigning a confidence value to the candidate term/synonym pair. Referring to FIG. 2, for example, the adjacent context evaluation engine 216 will not include the candidate term/synonym pair "AA→American Airlines" in the selected candidate term/synonym pairs and confidence values 245 communicated to the query revision engine 210. The query revision engine 210 cannot communicate the candidate term/synonym pair "AA→American Airlines" to the floating context evaluation engine 218 as one of the selected candidate term/synonym pairs 250, as it never received the candidate term/synonym pair "AA→American Airlines" from the adjacent context evaluation engine 216. The floating context evaluation engine 218 will not evaluate the candidate term/synonym pair "AA→American Airlines".

In some cases, it is determined that the revision is not supported by the adjacent context (step 604) and the candidate synonym is not a definitive non-synonym (step 606). For example, for an original query "AA pet flight guidelines", the adjacent context evaluation engine 216, using data included in the adjacent context database 240, determines that the revision of the query "AA pet flight guidelines" substituting the candidate synonym "American Airlines" as a synonym for "AA", is not supported by the adjacent context. The adjacent context evaluation engine 216 makes the determination based on the low confidence value assigned to the adjacent query term "pet" in the context of the particular query term "AA" for the candidate term/synonym pair "AA→American Airlines." The low confidence value does not satisfy a particular threshold. In addition, the adjacent context evaluation engine 216 using data included in the adjacent context database 240, determines that the revision of the query "AA pet flight guidelines" substituting the candidate synonym "Alcoholics Anonymous" as a synonym for "AA", is not supported by the adjacent context. The adjacent context evaluation engine 216 makes the determination based on the low confidence value assigned to the adjacent query term "pet" in the context of the particular query term "AA" for the candidate term/synonym pair "AA→Alcoholics Anonymous." The low confidence value does not satisfy a particular threshold. The adjacent context evaluation engine 216 determines that the candidate synonyms "American Airlines" and "Alcoholics Anonymous" are not definitive non-synonyms for query term "AA".

The process 600 evaluates the floating context for the particular query term (step 608). For example, the floating context evaluation engine 218 can identify non-adjacent query terms to the particular query term in the original search query. The floating context evaluation engine 218 can assign a confidence value to a candidate synonym for the particular query term when the particular query term is evaluated in the context of the non-adjacent query term. The confidence value assigned to the non-adjacent query term can also be assigned as a confidence value for the candidate term/synonym pair that includes the particular query term and the candidate synonym. Using the example original query, "AA pet flight guidelines", where "AA" is the particular query term and "American Airlines" is a candidate synonym for "AA", the floating context evaluation engine 218 can identify the query term "flight" as a non-adjacent query term to the particular query term "AA". The floating context evaluation engine 218 can assign a high confidence value to the non-adjacent query term "flight" when "American Airlines" is evaluated as a synonym for "AA" in the context of the non-adjacent query term "flight". As such, the floating context evaluation engine 218 can assign a high confidence value to the candidate term/synonym pair "AA→American Airlines", where the high confidence value satisfies a particular threshold.

In addition, the floating context evaluation engine 218 can evaluate "Alcoholics Anonymous" as a candidate synonym for "AA". The floating context evaluation engine 218 can assign a low confidence value to the non-adjacent query term "flight" when "Alcoholics Anonymous" is evaluated as a synonym for "AA" in the context of the non-adjacent query term "flight". As such, the floating context evaluation engine 218 can assign a low confidence value to the candidate term/synonym pair "AA→Alcoholics Anonymous", where the low confidence value does not satisfy a particular threshold.

If it is determined that the revision is supported by the floating context (step 610), the synonym is applied (step 614). For example, the candidate synonym "American Airlines" for the query term "AA" is supported by the floating context "flight" and, as such, the candidate synonym "American Airlines" can be applied as a synonym for "AA" in the original search query generating the revised query "American Airlines pet flight guidelines".

If it is determined that the revision is not supported by the floating context (step 610) and the synonym is not applied (step 612). For example, the candidate synonym "Alcoholics Anonymous" for the query term "AA" is not supported by the floating context "flight" and, as such, the candidate synonym "Alcoholics Anonymous" will not be applied as a synonym for "AA" in the original search query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying a particular query term of an original search query;
   identifying a candidate synonym for the particular query term;
   accessing stored data that specifies, for a pair of terms that includes the particular query term and the candidate synonym of the particular query term, a confidence value for a non-adjacent query term of the original search query that is not adjacent to the particular query term in the original search query;
   determining that, in the stored data that specifies, for the pair of terms that includes the particular query term and the candidate synonym of the particular query term, the confidence value for the non-adjacent query term satisfies a threshold; and
   determining to revise the original search query to include the candidate synonym of the particular query term, based on determining that the confidence value for the non-adjacent query term satisfies the threshold.

2. The method of claim 1, further comprising:
   identifying one or more skip words in the original search query; and
   selecting a query term of the original search query that is not adjacent to the particular query term in the original search query and that is not adjacent to a skip word.

3. The method of claim 1, further comprising:
   identifying a candidate synonym for the particular query term in context with an adjacent query term of the original search query that is adjacent to the particular query term in the original search query; and
   determining that, in the stored data that specifies, for the pair of terms that includes the particular query term and the candidate synonym of the particular query term, a confidence value for the adjacent query term does not satisfy a threshold.

4. The method of claim 3, further comprising:
   determining, in the context of the adjacent query term to the particular query term, that the candidate synonym is a definitive non-synonym for the particular query term; and
   determining not to revise the original search query, based on determining that the candidate synonym is a definitive non-synonym for the particular query term.

5. The method of claim 3, wherein the adjacent query term consists of two or more query terms that comprise a compound phrase.

6. The method of claim 3, wherein the adjacent query term is either immediately to the left or immediately to the right of the particular query term in the original search query.

7. The method of claim 1, further comprising:
   determining, in the context of a second non-adjacent query term to the particular query term, that the candidate synonym is a definitive non-synonym for the particular query term; and
   determining not to revise the original search query, based on determining that the candidate synonym is a definitive non-synonym for the particular query term.

8. The method of claim 1, further comprising:
   determining two or more query terms comprise a compound phrase; and
   selecting a particular query term of the original search query that is not included in the compound phrase.

9. The method of claim 1, wherein the non-adjacent query term consists of two or more query terms that comprise a compound phrase.

10. The method of claim 1, wherein the non-adjacent query term is a query term that is either to the left or to the right of the particular query term in the original search query, and that is separated from the particular query by at least one other query term of the original search query.

11. A computer storage medium encoded with a computer program, the program comprising instructions that when executed by one or more computers cause the one or more computers to perform operations comprising:

identifying a particular query term of an original search query;

identifying a candidate synonym for the particular query term;

accessing stored data that specifies, for a pair of terms that includes the particular query term and the candidate synonym of the particular query term, a confidence value for a non-adjacent query term of the original search query that is not adjacent to the particular query term in the original search query;

determining that, in the stored data that specifies, for the pair of terms that includes the particular query term and the candidate synonym of the particular query term, the confidence value for the non-adjacent query term satisfies a threshold; and determining to revise the original search query to include the candidate synonym of the particular query term, based on determining that the confidence value for the non-adjacent query term satisfies the threshold.

12. The computer storage medium of claim 11, the operations further comprising:

identifying one or more skip words in the original query; and selecting a query term of the original search query that is not adjacent to the particular query term in the original search query and that is not adjacent to a skip word.

13. The computer storage medium of claim 11, the operations further comprising:

identifying a candidate synonym for the particular query term in context with an adjacent query term of the original search query that is adjacent to the particular query term in the original search query; and determining that, in the stored data that specifies, for the pair of terms that includes the particular query term and the candidate synonym of the particular query term, a confidence value for the adjacent query term does not satisfy a threshold.

14. The computer storage medium of claim 13, the operations further comprising:

determining, in the context of the adjacent query term to the particular query term, that the candidate synonym is a definitive non-synonym for the particular query term; and determining not to revise the original search query, based on determining that the candidate synonym is a definitive non-synonym for the particular query term.

15. The computer storage medium of claim 13, wherein the adjacent query term consists of two or more query terms that comprise a compound phrase.

16. The computer storage medium of claim 11, the operations further comprising:

determining, in the context of a second non-adjacent query term to the particular query term, that the candidate synonym is a definitive non-synonym for the particular query term; and determining not to revise the original search query, based on determining that the candidate synonym is a definitive non-synonym for the particular query term.

17. The computer storage medium of claim 11, the operations further comprising:

determining two or more query terms comprise a compound phrase; and selecting a particular query term of the original search query that is not included in the compound phrase.

18. The computer storage medium of claim 11, wherein the non-adjacent query term consists of two or more query terms that comprise a compound phrase.

19. A system comprising:
one or more computers; and
a computer-readable medium coupled to the one or more computers having instructions stored thereon which, when executed by the one or more computers, cause the one or more computers to perform operations comprising:

identifying a particular query term of an original search query;

identifying a candidate synonym for the particular query term;

accessing stored data that specifies, for a pair of terms that includes the particular query term and the candidate synonym of the particular query term, a confidence value for a non-adjacent query term of the original search query that is not adjacent to the particular query term in the original search query;

determining that, in the stored data that specifies, for the pair of terms that includes the particular query term and the candidate synonym of the particular query term, the confidence value for the non-adjacent query term satisfies a threshold; and determining to revise the original search query to include the candidate synonym of the particular query term, based on determining that the confidence value for the non-adjacent query term satisfies the threshold.

20. The system of claim 19, the operations further comprising:

identifying one or more skip words in the original query; and selecting a query term of the original search query that is not adjacent to the particular query term in the original search query and that is not adjacent to a skip word.

21. The system of claim 19, the operations further comprising:

identifying a candidate synonym for the particular query term in context with an adjacent query term of the original search query that is adjacent to the particular query term in the original search query; and determining that, in the stored data that specifies, for the pair of terms that includes the particular query term and the candidate synonym of the particular query term, a confidence value for the ether adjacent query term does not satisfy a threshold.

22. The system of claim 21, the operations further comprising:

determining, in the context of the adjacent query term to the particular query term, that the candidate synonym is a definitive non-synonym for the particular query term; and determining not to revise the original search query, based on determining that the candidate synonym is a definitive non-synonym for the particular query term.

23. The system of claim 21, wherein the adjacent query term consists of two or more query terms that comprise a compound phrase.

24. The system of claim 19, the operations further comprising:

determining, in the context of a second non-adjacent query term to the particular query term, that the candidate synonym is a definitive non-synonym for the particular query term; and determining not to revise the original search query, based on determining that the candidate synonym is a definitive non-synonym for the particular query term.

25. The system of claim 19, the operations further comprising:

determining two or more query terms comprise a compound phrase; and selecting a particular query term of the original search query that is not included in the compound phrase.

26. The system of claim 19, wherein the non-adjacent query term consists of two or more query terms that comprise a compound phrase.

* * * * *

UNITED STATES PATENT AND TRADEMARK OFFICE
CERTIFICATE OF CORRECTION

PATENT NO.       : 8,538,984 B1
APPLICATION NO.  : 13/438125
DATED            : September 17, 2013
INVENTOR(S)      : Abhijit A. Mahabal Page 1 of 1

It is certified that error appears in the above-identified patent and that said Letters Patent is hereby corrected as shown below:

In the Claims

Column 26, line 43, Claim 21, before "adjacent" please delete "ether"

Signed and Sealed this
Tenth Day of December, 2013

Margaret A. Focarino
*Commissioner for Patents of the United States Patent and Trademark Office*